United States Patent
Cheng et al.

(10) Patent No.: US 8,095,132 B2
(45) Date of Patent: Jan. 10, 2012

(54) REMOTE SIM CARD REPLACEMENT AND ACTIVATION PROCESS

(75) Inventors: Diana Cheng, Meudon (FR); Michael Wai, Meudon (FR)

(73) Assignee: Axalto S.A., Meudon (FR)

( * ) Notice: Subject to any disclaimer, the term of this patent is extended or adjusted under 35 U.S.C. 154(b) by 387 days.

(21) Appl. No.: 10/557,744

(22) PCT Filed: May 18, 2004

(86) PCT No.: PCT/IB2004/001616
§ 371 (c)(1), (2), (4) Date: Dec. 11, 2006

(87) PCT Pub. No.: WO2004/105421
PCT Pub. Date: Dec. 2, 2004

(65) Prior Publication Data
US 2007/0167161 A1    Jul. 19, 2007

(30) Foreign Application Priority Data
May 22, 2003    (EP) ..................................... 03291219

(51) Int. Cl.
*H04W 4/00* (2009.01)
*H04M 1/66* (2006.01)
*H04M 1/68* (2006.01)
*H04M 3/16* (2006.01)
*H04M 1/00* (2006.01)
*H04M 9/00* (2006.01)
*H04B 1/38* (2006.01)
*H04K 1/00* (2006.01)

(52) U.S. Cl. ..................... 455/435.1; 455/410; 455/411; 455/558; 379/433.09; 380/247; 380/248; 380/249

(58) Field of Classification Search ............... 455/435.1, 455/410–411, 558; 379/433.09; 380/247–249
See application file for complete search history.

(56) References Cited

U.S. PATENT DOCUMENTS
6,285,869 B1 *    9/2001    Shannon et al. .............. 455/411
(Continued)

FOREIGN PATENT DOCUMENTS
WO    WO 9701253 A1 *   1/1997
WO    WO 02/058361 A    7/2002
(Continued)

*Primary Examiner* — Nick Corsaro
*Assistant Examiner* — Munsoon Choo
(74) *Attorney, Agent, or Firm* — Cozen O'Connor

(57) ABSTRACT

A data processing device including a microcontroller and configured to communicate with at least one remote system distributed on a network. The data processing device and the remote system are adapted to store a plurality of parameters identifying a user account belonging to a subscriber. The data processing device comprises a one-time parameter comprising the active account attached to the device designed for a one-time use, and a permanent parameter identifying an account attached to the data processing device, the permanent parameter being deactivated. The one-time and permanent parameter are stored in the at least one remote system, and the microcontroller is programmed to: use the one-time parameter to logon to the network when the data processing device is switched on; and exchanges the one-time parameter with the permanent parameter, upon successful logon to the network, the permanent parameter becoming the permanent active account. The first device and the at least one remote system store a parameter identifying a current active account attached to a second data processing device to replace, and upon successful logon to the network, a program automatically stored in the first device sends an activation request for exchanging the plurality of parameters from the old for the new one in the at least one remote system, with the current active account being deactivated.

5 Claims, 3 Drawing Sheets

U.S. PATENT DOCUMENTS 6,591,098 B1 * 7/2003 Shieh et al. .................... 455/419
7,817,992 B2 * 10/2010 Tuilier .......................... 455/418
2004/0120552 A1 * 6/2004 Borngraber et al. .......... 382/115

FOREIGN PATENT DOCUMENTS

WO    WO 03/041445 A    5/2003

* cited by examiner

| Old SIM Source File | Action | New SIM Destination File | Changes on the New SIM | Description |
|---|---|---|---|---|
| GSM ADN File | Copy | GSM ADN File | Phonebook Copied | Phonebook |
| GSM ADN File | Disable | GSM ADN File | Phonebook Disabled | Phonebook |
| GSM FDN File | — | GSM FDN File | Customer Care number preloaded | Fixed Dialing Number |
| GSM FDN File | Enable | GSM FDN File | Fixed Dialing Number Enabled | Fixed Dialing Number |
| GSM SMS File | Copy | GSM SMS File | SMS Copied | SMS |
| GSM ICCID File | Copy | Temporary File | Old ICCID value stored | Old IC Card ID |
|  | — | GSM ICCID File | ICCID Value preloaded | New IC Card ID |
| GSM IMSI File | Copy | Temporary File | Old IMSI value stored | Old International Mobile Subscriber Identifier |
|  | — | GSM IMSI File | One-time IMSI Preloaded | International Mobile Subscriber Identifier |
|  | — | Hidden IMSI File (Read Protected) | New IMSI Preloaded | N/A |
| GSM Ki File | Un-touch | GSM Ki File | One-time Ki Preloaded | Authentication Key |
|  | — | Hidden KI File (Read Protected) | New Ki Preloaded | N/A |
|  | — | With or without menu for activation request upon One-Time account activation or manual selection | Auto-Activation Application Preloaded | N/A |

*FIG.2*

REMOTE SIM CARD REPLACEMENT AND ACTIVATION PROCESS

RELATED APPLICATIONS

This is a U.S. National Phase Application under 35 USC 371 of International Application PCT/IB2004/001616, filed on 18 May 2004.

THE FIELD OF THE INVENTION

The invention deals with replacement of data processing devices. Each data processing device is attached to a respective account identifying a subscriber. In particular, the invention applies to SIM (Subscriber Identity Module) card replacement and the corresponding activation process of new accounts. Remote SIM Card Replacement and Activation process applies in the GSM (Global System for Mobile Communication) world where SIM plays an important role in identifying subscribers to the GSM network operator for services such as voice communications, mobile services, and mobile transactions. In our illustrated example, the account will be identified typically with a parameter called IMSI (International Mobile Subscriber Identity), as is known in the art. Nevertheless, the invention is not limited to this example, and any other parameters identifying a subscriber account is part of the invention.

BACKGROUND OF THE INVENTION

In a GSM environment, a network operator purchases SIM cards from various SIM vendors in batch and need to provision all the information (Card ID, Account Information, and the like) on the SIM card to their network system as well as various backend systems before activating a SIM account. For postpaid subscribers who settle their bill after usage by means of account transfer, payments by check, for example, this activation can be done when subscribers register their information at the operator's point-of-sale (POS). On the other hand, for prepaid subscribers who must pay in advance for these network services, activation has to be done in advance so the card is already activated when the subscriber purchases the card from any distribution channel such as operator's POS or authorized dealers.

Each time the network operators roll out new services, or when these services require change of the SIM card, operators need to either send the new SIM card to their postpaid subscribers (as the subscriber information is registered), or ask them to go to their nearest POS to exchange for a new SIM card. For prepaid subscribers, they have to purchase a new SIM card from the distribution channels to replace a current SIM card.

The process and efficiency of SIM replacement become a hassle when large amounts of SIM cards need be replaced, causing subscribers undue inconvenience in most cases. The amount of backend processes involved in the postpaid scenario has been automated as a standard operation at the POS level, but not applicable to most operators when performing a remote (outside POS) card replacement. For a prepaid subscriber's SIM replacement, it is even impossible in most operators when the existing account information is unknown to the network operators. Therefore, it is particularly difficult and a huge obstacle for network operators to roll out new services that require SIM card replacement.

Moreover, as operators are under tremendous cost pressure, pre-activating all prepaid accounts is always an issue due to investment in network equipment for pre-load accounts storage before activation. Most common network equipment, including the AuC (Authentication Center) and HLR (Home Location Registry) which has only fixed capacity per system for storing subscriber account information, have to be increased as more and more accounts are preloaded into these systems.

WO 03/041445 discloses a system and method to allow the same terminating telephone number with multiple mobile telephones. A server is operable to receive the first call made from a new mobile phone and determine if a user of this new mobile phone is a returning user of a previous mobile telephone. In this case, the server obtains from the user of the newly activated mobile telephone, a telephone number of the previous mobile telephone and assigns this telephone number to the newly activated mobile phone.

WO 02/018361 discloses a system and method for using a temporary electronic serial number for over-the-air activation of a SIM based mobile device. The method comprises preprogramming the SIM card with temporary activating identifiers such as an IMSI, and/or a mobile identification number, and a temporary electronic serial number, and to use this temporary electronic serial number to identify the mobile device during registration and activation. Once the activation process is completed, the temporary activation identifiers are overwritten.

SUMMARY OF THE INVENTION

A remote SIM replacement process is necessary to be in place to resolve the SIM replacement (and perform activation after replacement) issue. The process should ensure that proper security is in place to avoid fraud, and at the same time, should be fault proof without much user inconvenience and intervention. The solution should also enable a remote SIM card activation after replacement which can help the operators to provide just-in-time provisioning and activation of the accounts to the AuC, HLR and various backend systems. Thus, it can help operators better utilize the investment on the systems' capacity when necessary.

To this end, according to the invention, the new SIM includes
  A one-time parameter (IMSI/Ki) known from the network (HLR, AuC), said one-time parameter being the active account, and
  New parameters identifying a new account (IMSI/Ki) attached to a new data processing system,
According to the invention, the activation steps are the followings:
  1) When the data processing system is switched on, the one-time IMSI/Ki is used to login to the network;
  2) Upon successful login to the network, a program stored in the new SIM automatically sends an activation request for activating said new account.

Therefore, the invention provides SIM swapping and activation, which are in the hand of end user and the same Onetime IMSI/Ki is used for a set of new cards.

BRIEF DESCRIPTION OF THE DRAWINGS

FIG. 2 is a file structure of the new SIM card, in place to facilitate the remote replacement and activation.

DETAILED DESCRIPTION OF THE DRAWINGS

Figure 1:
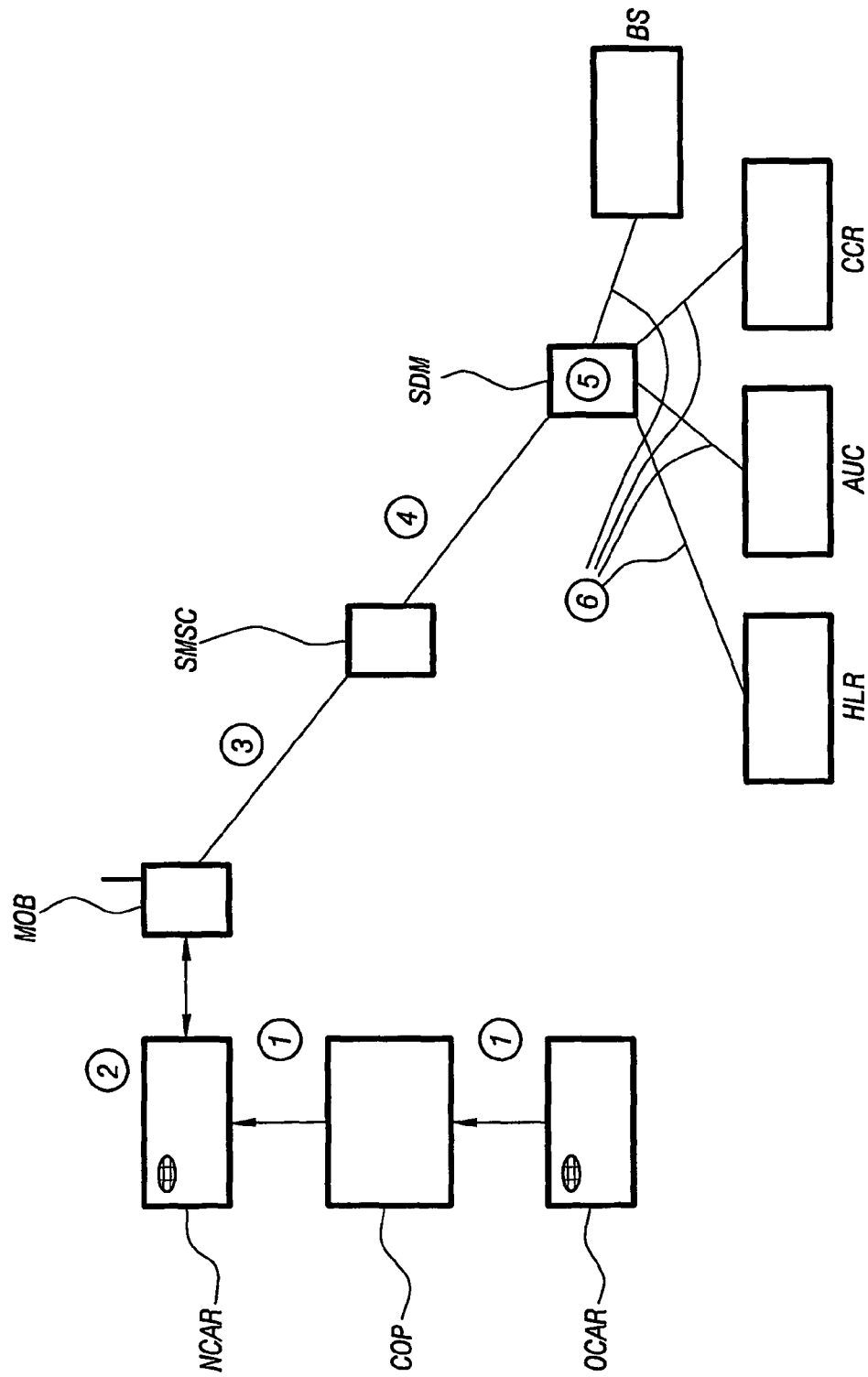
FIG. 1 is a view of a computer system in which the invention can be applied.

To simplify the description, the same elements illustrated in the drawings have the same references.

FIG. 1 is a view of a system that includes:
an old SIM card OCAR;
a new SIM card NCAR;
a SIM copy device;
a mobile phone MOB where a SIM card can be inserted into;
the mobile phone communicates with a SMS center SMSC; and
the SMS center SMSC communicates with a SIM data management SDM communicating with a plurality of entities able to manage the account attached to each SIM card. Management of a SIM card includes network authentication, mobile localization, and the like.

For each SIM card, there are two basic elements on the card in order for the network to identify the subscribers: (1) a IMSI (International Mobile Subscriber Identity) and, (2) a Ki (Authentication key). The IMSI serves as the account identifier, whereas the Ki is used when the subscriber's mobile station (handset/phone) is requesting to logon to the network. There is an ICCID (IC Card Identifier) on the card in order for the operator to act as the SIM card ID as it serves as the serial number of the card in most cases.

The network authenticates the SIM card (identified by the IMSI value) based on the authentication result generated by the Ki and the on-card authentication algorithm, for example, the Comp128 algorithm defined in the GSM specification. In order for the subscriber to logon to the network, the IMSI and Ki value must be preloaded onto the network's AuC for a successful authentication to be performed. If the IMSI and Ki are not present in the AuC, the subscriber cannot logon to the network due to an inexistent IMSI entry. This will be the key in the replacement process that the IMSI, Ki pair of the card being replaced must be removed from the AuC, followed by the replacement of the new IMSI, Ki value of the replacement (new) card.

There are two aspects to the solution, that is, the Remote SIM Card replacement and the Remote SIM activation.

There are three components in the SIM Card replacement process:
1) The old SIM card OCAR;
2) The new SIM card NCAR; and
3) Any form of SIM copy device COP (hereafter refer as 'the SIM copy device') which can read and write SIM data in and out from the old and into the new SIM (e.g., a software on PC with a smart card reader attached, a customized hardware device to read and write onto the smart card).

Old SIM Card OCAR contains existing account information. The NEW SIM Card NCAR contains the following information:
1. The new IMSI, KI in a hidden file ready to be activated;
2. A One-time IMSI, One-time KI in order for the new card to get the access to the network to perform one-time activation request;
3. The ability to make phone calls to predefined phone numbers only before activation with the One-time account. This One-time account will be described in detail in the next section. Usually, the predefined numbers will be the customer care center number in case for any query.
4. A small hidden application with the ability to send out an Activation Request to a dedicated address for account activation by SMS, USSD String, or any other means to inform the backend for such request when the user initiate an Activation Request in the form of menu selection on the phone, or auto-trigger after the One-time account activation.

The SIM copy device COP copies the following information from the OLD card to the NEW card:
The ICCID and IMSI from the OLD card to the NEW card hidden file;
The Phonebook entries from the OLD card to the NEW card Phonebook file;
The Short Message Service (SMS) entries from the OLD card to the NEW card SMS file; and
Any other customized information from the OLD SIM to the NEW SIM.

In remote card replacement, the SIM copy device COP copies all OLD card information (ICCID, IMSI, Phonebook, SMS entries, etc) from the old card OCAR into the new SIM card NCAR so that the NEW SIM sends out an Activation Request to the network with the Old Account information (OLD ICCID, OLD IMSI) and the NEW Account information (NEW ICCID, NEW IMSI).

Since the SIM copy device COP also copies the phonebook, SMS entries, and the like to the NEW SIM, upon new card activation, the new SIM NCAR will preserve all the old card information with the new services in placed.

In this example, after the NEW card NCAR has sent out the Activation Request, another component at the network side, namely "the SIM Data Management System" SDM, processes the Activation Request. The SIM Data Management System SDM mainly serves the following purposes:
1. Receive Activation Request from the subscribers;
2. Deactivate the Old account based on the information received (Old ICCID, Old IMSI) from the subscriber. Deactivation will be done on the AuC, HLR, or any other systems required; and
3. Activation of the New account based on the information received (New ICCID, New IMSI) from the subscriber and provision to the AuC, HLR, or any other systems required.

With the SIM Data Management System in place, it is not required to provision all the account information into various systems before activation. The activation will be done in a "just-in-time" fashion which greatly saves space on the AuC and the HLR.

The reason a one-time IMSI/Ki is used rather than the new IMSI/Ki is to ease the number of activated subscriptions. An advantage is that the SIM Data Management Server SDM determines in which HLR/AuC the new IMSI/Ki resides at the time of activation. Consequently, this allows better management of HLR subscription capacity and the one-time IMSI/Ki is shared with multiple cards.

The purpose of the new card before activation is to send the activation request. This is why every new card uses the same number as long as the information sent out from the new card NCAR contains the OLD card's IMSI and NEW card (SCB) embedded IMSI for reference.

This solution minimizes any user error/involvement by making use of OLD card information when the NEW card is inserted into the handset after information transfer from the device or any terminal/reader has been carried out. The following describes the steps associated with the components mentioned in the foregoing description.

Step 1: Subscriber Replaces the Old SIM Card.

A subscriber purchases or receives a new SIM card from the operator or from the operator's distribution channel. Thanks to the SIM copy device from the distributor or purchased or sent together with the new SIM card NCAR, the subscriber can copy all the existing (also refer to as "old") information from the existing SIM card to the new SIM card NCAR.

FIG. 2 gives an example of a new SIM file structure in place to facilitate the remote replacement and activation.

Figure 3:
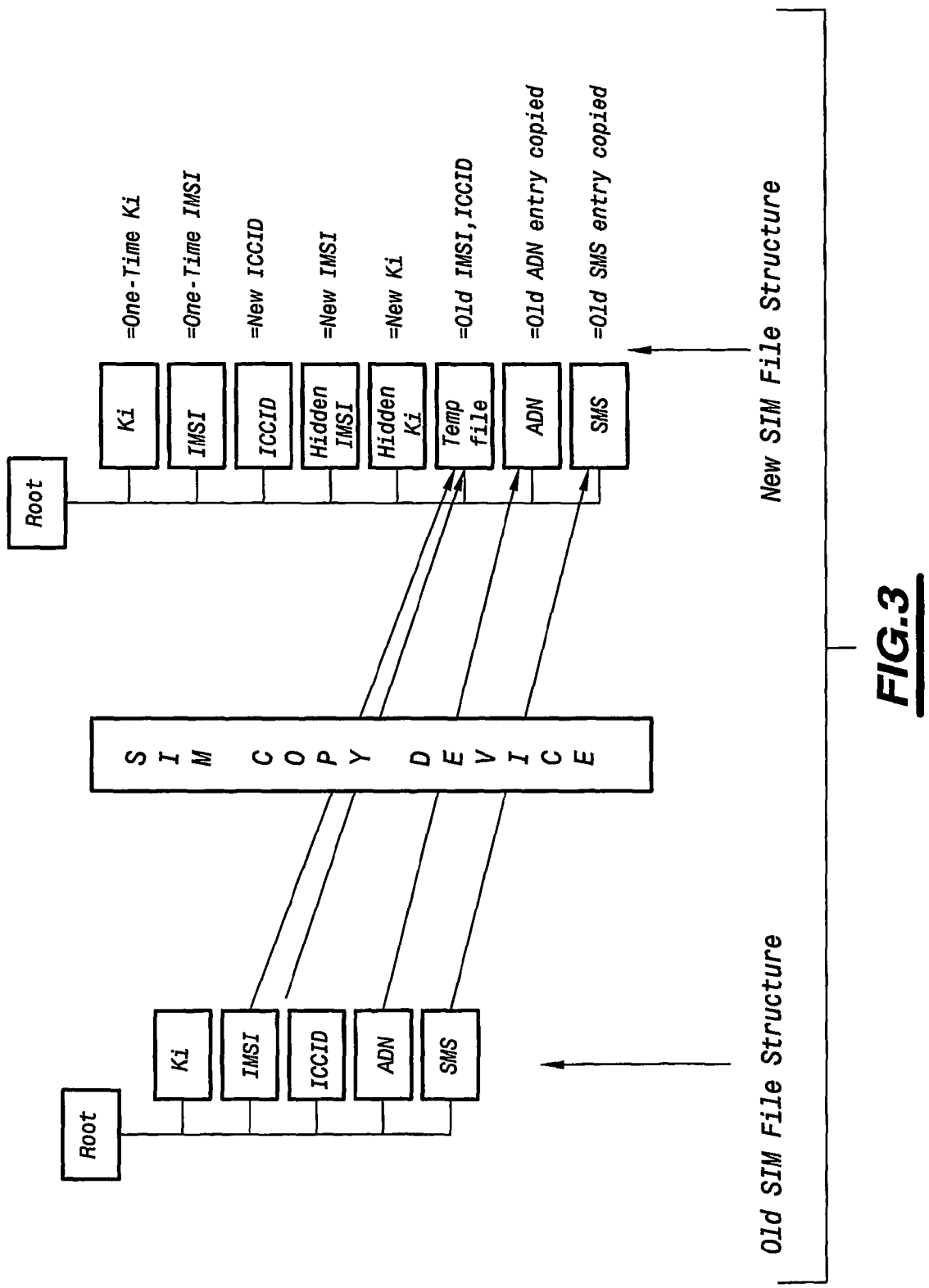
FIG. 3 is a diagram showing the information copied from the old SIM card into the new SIM card.

FIG. 3 shows part of the files stored in the old card OCAR and the new SIM card NCAR. On the left of this figure, we have represented the old SIM file structure and on the right the new SIM file structure (we have only represented the related files). More particularly, arrows indicate the information copied from the old OCAR into the new SIM card NCAR. The SIM copy device COP copies the following information from the old SIM to the new SIM according to the location in the previous table. In this example, the One-Time IMSI and Ki is an existing account on the network for all the new cards to logon to the network for Activation Request. The account cannot make phone calls due to the network setup as well as on-card FDN (Fixed Dialing Number) enabled for Customer Care center only.

Step 2: Subscriber Activates the New SIM Card

In this example, the subscriber puts the new SIM card NCAR in the mobile device MB to start the first Activation Request. Upon insertion of the new SIM card NCAR, the SIM card and the Auto-Activation application perform the following steps:

1. The new SIM Card NCAR authenticates with the network using the One-time IMSI and the response calculated from the One-time Authentication Key, Ki.

2. Upon successful logon to the network, in this example, the Auto-Activation application sends out a Activation Request to the SIM Data Management Server SDM connected to the SMSC. The application sends information (with encryption and checksum) that includes, for example:

The Old ICCID and the Old IMSI in the temporary file that is to be disabled; and The New ICCID and the New IMSI from the hidden file that is to be enabled. For security reasons, old/new KI are not sent out at any time by the applet; Only IMSI, ICCID are sent.

3. Upon successful sending of the Activation-Request-SMS, the Auto-Activation application exchanges the One-Time IMSI and One-Time Ki with the New IMSI, and New Ki in the hidden file to replace the existing IMSI and Ki value. It then enables the ADN and disables the FDN.

In this example, it prompts the user to "Activation in Progress" and prompts the user to switch off the phone. The new SIM waits for the SIM Data Management System to activate the account.

On the SIM Data Management SDM Side, the Action are as Follows:

1. The SIM Data Management SDM receives the Activation Request, decrypts the information and checks against the checksum for validity. It then looks up from the other network repository the account information in order to deactivate the account.

2. There are two approaches the network operator takes with regards to the Old account IMSI/Ki deactivation and New account IMSI/Ki activation:

a) Deactivate Old Account and Activate New Account:

In this case, the old account information does not carry forward to the new account and the SIM Data Management System SDM issues commands to various systems like, AuC, HLR, a Customer Care CCR, Billing System BS, to deactivate/remove the old account and activate/create the new account in the above systems.

b) Change Old Account and Carry Forward to New Account:

In this case, the old account information carries forward to the new account and the SIM Data Management System SDM simply issues commands to various systems to carry the old account information to the new one and replace the Old account information in the HLR, AuC by the New account.

3. Advantageously, upon successful deactivation Old Account and activation of the New Account, the SIM Data Management System SDM can send, for example, an optional SMS to confirm the activation to the subscriber. If the SMS is successfully delivered to the handset within a predefined period, the system can record that a successful activation has been carried out.

4. If any failure has occurred during the 1) deactivation, 2) activation, or 3) sending of such optional Confirmation-SMS, a proper exception handling process can be defined by an appropriate workflow, i.e., sending an alarm to the Customer Care to investigate and take corrective measures on the recovery procedure at the backend.

FIG. 1 shows a view of the different steps involved. Arrows referenced with a respective number (1 to 6) indicate the direction of each message. The different steps are:

1. The SIM copier COP copies the old ICCID, IMSI to the New Card.

2. NEW SIM card NCAR is inserted into the phone MOB, logon to the network using the One-time a/c. It then sends out the old and new card information in step 3. Upon successful sending, New IMSI and KI are overwritten to replace the existing One-time account waiting for activation.

3. The card NCAR sends out the Activation Request with "Old ICCID/IMSI, New ICCID/IMSI" information to the backend using this One-Time a/c.

4. A dedicated SMSC receives the Activation Request, and passes the request to SIM Data Management SDM.

5. SIM Data Management system SDM processes the request, fetches for the corresponding account information from the Old and New ICCID/IMSI, and performs backend replacement/activation process.

6. SIM Data Management system SDM updates various systems, including AuC for Card Activation.

The invention claimed is:

1. A first subscriber identifying module including a microcontroller in a mobile telecommunication network which is configured to communicate with at least one remote system in the mobile telecommunication network, said first subscriber identifying module and said remote system being adapted to store at least one parameter identifying a user in the network, said first subscriber identifying module comprising:

a one-time account identifier designed for a one-time logon to the network;

a permanent account identifier, said permanent account identifier being deactivated and attached to the first subscriber identifying module; and another permanent account identifier, said another permanent account identifier being activated and attached to a second subscriber identifying module, wherein the another permanent account identifier is copied from the second subscriber identifying module to the first subscriber identifying module;

wherein said one-time and another permanent account identifier are prestored in said at least one remote system, and wherein said microcontroller is programmed to:

a) use the one-time account identifier to logon to the network when said first subscriber identifying module is switched on;

b) exchange the one-time account identifier with the permanent account identifier in the first subscriber identifying module upon successful logon to the network as the active account identifier in the first subscriber identifying module; and c) upon successful logon to the network, send an activation request including the permanent account identifier and the another permanent account identifier to said at least one remote network for deactivating in said at least one remote network the another permanent account identifier attached to the second subscriber identifying module, wherein the step b) is performed in said first subscriber identifying module by an auto-activation application executed after receiving a message from the network informing a successful logon.

2. The first subscriber identifying module according to claim 1, wherein the permanent account identifier attached to the first subscriber identifying module identifies an account which is different from an account identified by the another permanent account identifier attached to the second subscriber identifying module.

3. The first subscriber identifying module according to claim 1, wherein said first subscriber identifying module is a SIM card.

4. The first subscriber identifying module according to claim 1, wherein the logon step a) is performed in a centralized remote system and, after receiving the activation request from said first subscriber identifying module, said centralized remote system sends commands to said at least one remote system for exchanging a current active account corresponding to the another permanent account identifier attached to the second subscriber identifying module into a new active account corresponding to the permanent account identifier attached to the first subscriber identifying module.

5. A method for activating a subscriber identifying module in a telecommunication network, said method comprising the steps of:

providing a first subscriber identifying module which stores a one-time account identifier designed for a one-time logon to the network, a permanent account identifier, said permanent account identifier being deactivated, and another permanent account identifier, said another permanent account identifier being activated and attached to a second subscriber identifying module, wherein the another permanent account identifier is copied from the second subscriber identifying module to the first subscriber identifying module, said first subscriber identifying module being programmed to automatically, upon successful one-time logon to the network, exchange the one-time account identifier with the permanent account identifier in said first subscriber identifying module and send an activation request including the permanent account identifier and the another permanent account identifier to a remote network system for activating said permanent account identifier attached to the first subscriber identifying module; and providing a remote network system which stores the another permanent account identifier attached to the second subscriber identifying module, said remote network system being programmed for treating the activation request originating from the first subscriber identifying module by the operations which include deactivating the another permanent account identifier attached to the second subscriber identifying module and activating the account identifier attached to the first subscriber identifying module.

* * * * *